United States Patent [19]
Kanzawa et al.

[11] Patent Number: 6,019,822
[45] Date of Patent: Feb. 1, 2000

[54] APPARATUS FOR AIR DEHUMIDIFICATION HAVING A UNITARY CASING FOR A CYCLONE SEPARATOR, A PRIMARY FILTER, A SECONDARY FILTER, AND A SEPARATION MEMBRANE ELEMENT

[75] Inventors: Terukazu Kanzawa; Hideaki Tanaka, both of Kobe, Japan

[73] Assignee: Misuzu Machineries & Engineering Ltd., Kobe, Japan

[21] Appl. No.: 08/910,026

[22] Filed: Aug. 12, 1997

[51] Int. Cl.⁷ .......................... B01D 50/00; B01D 45/12; B01D 53/29; B01D 53/22
[52] U.S. Cl. .................................... 96/8; 96/190; 96/208; 55/319; 55/337; 55/339; 55/459.1; 55/461; 55/478; 55/487; 55/489; 55/DIG. 17
[58] Field of Search .............................. 55/332, 337, 339, 55/340, 459.1, 459.2, 459.3, 459.4, 459.5, DIG. 17, 318, 320, 319, 486, 487, 489, 478, 461; 96/8, 10, 188, 204, 206, 208, 189, 190

[56] References Cited

U.S. PATENT DOCUMENTS

| | | | |
|---|---|---|---|
| 4,028,076 | 6/1977 | Fields | 55/337 |
| 4,881,953 | 11/1989 | Prasad et al. | 96/10 |
| 5,525,143 | 6/1996 | Morgan et al. | 96/10 |
| 5,743,925 | 4/1998 | Bench | 55/337 |

FOREIGN PATENT DOCUMENTS

| | | | |
|---|---|---|---|
| 1554984 | 4/1990 | Russian Federation | 55/459.1 |
| 2221168 | 1/1990 | United Kingdom | 55/337 |

*Primary Examiner*—David A. Simmons
*Assistant Examiner*—Robert A. Hopkins
*Attorney, Agent, or Firm*—Wenderoth, Lind & Ponack, L.L.P.

[57] ABSTRACT

An air dehumidifying apparatus having a cyclone separator, a primary filter, a secondary filter, and a separation membrane element made of a special high polymer for passing steam smoothly and hardly passing air. The elements of the apparatus are disposed in a flow direction of air, so that the air may pass sequentially. Also, a casing is provided for forming an outer wall of the cyclone separator and accommodating the primary and secondary filter and separation membrane element. Large particles of oil, moisture, dust and other foreign matter are removed by the cyclone separator. As a result, the life of the primary filter is extended. By putting the filters and separation membrane element into one casing, the apparatus is reduced in size, and is installed easily.

10 Claims, 3 Drawing Sheets

APPARATUS FOR AIR DEHUMIDIFICATION HAVING A UNITARY CASING FOR A CYCLONE SEPARATOR, A PRIMARY FILTER, A SECONDARY FILTER, AND A SEPARATION MEMBRANE ELEMENT

BACKGROUND OF THE INVENTION

1. Field of the Invention

The present invention relates to an air dehumidifying apparatus for dehumidifying damp air, and more particularly to an air dehumidifying apparatus used for dehumidifying compressed air for marine control equipment.

2. Description of the Related Art

There are known various types of air dehumidifying apparatus, and in marine use, for example, the air dehumidifying apparatus of refrigerating and reheating type has been mainly employed hitherto. The air dehumidifying apparatus of refrigerating and reheating type is an air dehumidifying apparatus of a type of separating steam from damp air by condensing the steam contained in the damp air, and has such advantages as stable performance and easy operation. As a refrigerant contained in the refrigerating machine used in the air dehumidifying apparatus of this refrigerating and reheating type are used generally, chlorofluorocarbons (CFCs) such as R-12 ($CCl_2F_2$) and hydrochlorofluorocarbons (HCFCs) such as R-22 ($CHClF_2$), and the manufacture of such CFCs has been already prohibited or limited by international treaty or is to be prohibited or limited shortly. Therefore, it will not be permissible to supply CFCS as the refrigerant stably and continuously in future, and it is predicted that it will be difficult to employ the air dehumidifying apparatus of refrigerating and reheating type using such conventional CFCs as the refrigerant. On the other hand, the refrigerants out of the scope of such international treaty and the refrigerating machines using such refrigerants are still in the developmental stage, and not are not in practical use.

As the air dehumidifying apparatus, meanwhile, other types are also known, such as the silica gel type and seawater cooling type. The air dehumidifying apparatus of the silica gel type is an air dehumidifying apparatus of a type of adsorbing and removing moisture from damp air by the capillary phenomenon by using silica gel, and it comprises two adsorption towers containing silica gel, and is operated in a specific cycle so that each adsorption tower may adsorb and release moisture alternately. Due to the necessity of two adsorption towers, such apparatus has a problem that the apparatus is increased in size. The air dehumidifying apparatus of the seawater cooling type is an air dehumidifying apparatus of a type which separates steam from air by cooling damp air by seawater and condensing the steam contained in the damp air. This process, however, has a problem of low performance because the damp air cannot be cooled to a temperature lower than the temperature of the seawater.

Further, regarding an air dehumidifying apparatus of another type, recently, attention is being given to an air dehumidifying apparatus having a high performance by utilizing a separation membrane having a property of separating steam in air. However, the damp air to be dehumidified, for example, compressed air boosted by an air compressor contains oil, dust or foreign matter, and when foreign matter gets into the separation membrane, it clogs the fine passage in the membrane for passing damp air, and shortens the service life of the separation membrane. In marine use, in particular, it is more difficult to supply and repair parts than in land use such as in a factory or the like, and therefore the air dehumidifying apparatus of separation membrane type was not widely installed because of a strong demand for service life and reliability of parts of the apparatus. Alternatively, although it is also attempted to use a filter for the purpose of extending the life of the separation membrane, there is a problem that the filter life is short.

Conventionally, moreover, in the air dehumidifying apparatus of separation membrane type, the container accommodating the separation membrane for composing the air dehumidifying apparatus, filters, pipes, and valves are composed independently, and they are arranged and connected by piping at the site of installation of the air dehumidifying apparatus to complete the air dehumidifying apparatus. Therefore, the apparatus is larger in size, and especially in marine use, the work load increases in the poor working environments found in a ship. In the ship, and in a small ship in particular, although there is a small space for installing machines such an as air dehumidifying apparatus, such air dehumidifying apparatus of the separation membrane type requires a wide space for installation.

SUMMARY OF THE INVENTION

It is hence an object of the invention to solve the problems in the prior art devices, and to provide an air dehumidifying apparatus capable of extending the service life of the separation membrane and filter, and it is a further object of the invention to provide an air dehumidifying apparatus which requires a small space for installation and is easy to install.

In a first aspect of the invention an air dehumidifying apparatus comprises:

a cyclone separator;

a primary filter;

a secondary filter having a smaller mesh size than that of the primary filter; and a separation membrane element for separating steam from air having passed through the secondary filter, disposed so as to pass and send out introduced air sequentially, wherein the separated steam and the dehumidified air are sent out individually.

According to the invention, the air dehumidifying apparatus comprises, as constituent components thereof, the cyclone separator, the primary filter, the secondary filter, and the separation membrane element, which are disposed so as to pass and send out the introduced air sequentially. The cyclone separator, filters, and separation membrane element are disposed, for example, in a casing so that the introduced air may sequentially pass through with ease. This casing may be also formed individually for each constituent component, or may be formed integrally so as to accommodate all constituent components together. In the case of individual casings, the individual constituent components are connected by piping.

Since the air dehumidifying apparatus is thus constituted, even if the air introduced into this air dehumidifying apparatus, that is, the air to be dehumidified, is damp air of high humidity, containing foreign matter such as oil, moisture and dust, dehumidified dry air from which the foreign matter is removed can be sent out. More specifically, the air introduced into the air dehumidifying apparatus is first supplied into the cyclone separator, and the cyclone separator removes relatively large and heavy particles of the foreign matter contained in the air, mainly by centrifugal separation, from the air. The air having passed through the cyclone separator is supplied into the primary filter, and the primary filter has a mesh size of several microns, for example, and removes fine foreign matters not separated by the cyclone separator, from the air having passed through the cyclone separator.

Consequently, the air having passed through the primary filter is supplied into the secondary filter, and the secondary filter has a further smaller mesh than that of the primary filter, for example, about 1/100 $\mu$m, and can remove very fine foreign matter such as oil mist, which cannot be removed by the primary filter, from the air having passed through the primary filter, so that the foreign matter may be removed almost completely from the air coming into the air dehumidifying apparatus. The air having passed through the secondary filter is supplied into the separation membrane element, and the separation membrane element can separate steam from air, and removes steam from the air having passed through the secondary filter, so that the steam and the dehumidified air can be sent out individually. That is, the separation membrane element has a separation membrane composed of special high polymer such as polyimide, and this separation membrane has a property of passing steam very smoothly and hardly allowing air to pass through. Therefore, for example, when a tube is formed of such separation membrane, and the air passing through the secondary filter being rid of foreign matter almost completely is supplied into the tube made of the separation membrane, the steam in the air passes through the membrane to be discharged outside of the tube, while the air having passed through the tube is dehumidified to be dry air sufficiently low in dew point.

Such air dehumidifying apparatus has a high dehumidifying performance, and according to this apparatus, since the air to be humidified is supplied into the separation membrane element after passing through the cyclone separator and the both filters, oily matter, dust and other foreign matter in the air to be dehumidified are removed almost completely in the process of passing through the cyclone separator, primary separator, and secondary separator because the mesh size of the secondary separator is very small, and therefore the separation membrane is not clogged by foreign matter and its life is extended. Moreover, in the secondary filter for removing very fine foreign matter out of the foreign matter contained in the air to be dehumidified, since the air having passed through the cyclone separator and primary filter is supplied, the filtering load of the secondary filter is lessened substantially, and the life of the secondary filter is extended, and its filtering performance is maintained favorably for a long period. Further, out of the foreign matter contained in the air to be dehumidified, large particles occupying a considerable portion are removed by the cyclone separator, and the filtering load of the primary filter is much lessened, and the life of the primary filter is extended and its filtering performance is maintained favorably for a long period. The cyclone separator for lowering the filtering load of the primary filter removes foreign matter mainly by centrifugal separation, and therefore the separation performance of foreign matter is not lowered by removing foreign matter.

In this way, by disposing the filters on the upstream side of the air passing direction of the separation membrane element, and the cyclone separator on the upstream side of the air passing direction of the filters, the life of the separation membrane element can be extended and the life of the filters can be further extended. As a result, also in marine use where high maintainability and reliability are demanded, the air dehumidifying apparatus of separation membrane type can be put to practical use.

In a second aspect of the invention, the air dehumidifying apparatus further comprises one casing for accommodating the primary filter, secondary filter and separation membrane element, wherein at least an outer wall of the cyclone separator is formed by the casing.

According to the second aspect of the invention, since the primary filter, secondary filter and separation membrane element are put together into one casing, and the cyclone separator is also contained in this one casing, the entire apparatus is integrated, and hence the apparatus can be substantially reduced in size as compared with the constitution in which constituent components are separately and independently formed, which are connected by piping. Furthermore, since the apparatus of the invention does not require piping connection among the constituent components or installation of the individual components, the installation work is easy and the maintainability is enhanced. In particular, the installation working efficiency in ships where the installation work is carried out in a narrow space is much enhanced. Further, among the constituent components, since the air flows in the passage formed by one casing, the distance among the individual constituent components may be a minimum, the air flow is smooth, the pressure loss decreases, and the performance of the air dehumidifying apparatus is enhanced. Such casing may be manufactured easily by, for example, casting. Hence, the manufacture of the air dehumidifying apparatus is easy, and the cost is reduced. Thus, by disposing the constituent elements into one casing, the air dehumidifying apparatus may be compact, the cost is reduced, the installation work is easy, the performance is enhanced, and the maintenance is easy. As a result, a very practical air dehumidifying apparatus for marine use is realized, and this air dehumidifying apparatus can replace or compensate for the air dehumidifying apparatus of refrigerating and reheating type mainly used so far. In addition, since the weight is considerably reduced as compared with the refrigerating type, the labor is saved in both transportation and installation.

In a third aspect of the invention, the separation membrane element has a bundle element composed of a plurality of pipes in the form of a bundle, the air having passed through the secondary filter flows in the plurality of pipes, and a ventilation path for supplying part of the air discharged from a plurality of outside positions of the bundle element through the plurality of pipes into spaces among the pipes of the bundle at a longitudinal one end of the bundle to discharge outside from a plurality of positions at another longitudinal end of the bundle opposed to the one longitudinal end is formed.

According to the third aspect of the invention, the ventilation path is formed in which part of the dehumidified air having passed through a plurality of pipes forming the separation membrane element is fed into the space among the pipes from plural positions outside at one end in the length direction of the bundle element composed of a plurality of pipes, and is discharged outside form plural positions at other end of the bundle element, and therefore, while part of the dehumidified air is uniformly supplied outside of the pipes, it passes through the space among the pipes. Hence, the steam discharged from the pipes can be efficiently discharged outside of the separation membrane element by part of the dehumidified air.

In a fourth aspect of the invention, the cyclone separator comprises:

the outer wall having a right cylindrical inner circumference, and an inner tube disposed in the space enclosed by the inner circumference of the outer wall, for partitioning the space into an inside region at the inner side in the radial direction, and an annular outside region outward in the radial direction from the inside region;

in the outer wall is formed an air lead-in hole opened opposite to the outside region, for supplying air toward the supply direction deviated outward in the radial direction from a central axial line of the inner circumference of the outer wall;

a passage sectional area of the air lead-in hole is selected to be smaller than that of the outside region; and the inner tube has a communication hole for communicating between the inside region and outside region, one closed axial end and another axial end provided with a discharge port communicating with the primary filter.

According to the fourth aspect of the invention, the cyclone separator has the outer wall and the inner tube, and the space enclosed by the cylindrical inner circumference of the outer wall is partitioned by the inner tube into the inside region at the inward side of the radial direction and the annular outside region outward in the radial direction. The air lead-in hole opposite to the outside region is formed in the outer wall, and the communication hole communicating between the inside region and outside region is formed in the inner tube, and moreover one end in the axial direction of the inner tube is clogged, and the discharge port communicating with the primary filter is provided at the other end in the axial direction. In this constitution, the air to be dehumidified which is sent into the air dehumidifying apparatus and supplied into the cyclone separator is guided from the air lead-in hole into the outside region, and moved from this outside region to the inside region through the communication hole, and is discharged toward the primary filter through the discharge port from the inside region.

The air lead-in hole feeds the air to be dehumidified toward the supply direction deviated outward in the radial direction from the central axial line of the:inner circumference of the outer wall, and therefore the air to be dehumidified moves while rotating about the central axis of the inner circumference of the outer wall in the outside space, and collides against the inner circumference of the outer wall by centrifugal force. Therefore, oily matter, dust and foreign matter contained in the air to be dehumidified are greater in specific gravity than the air, and are hence likely to collide against the inner circumference of the outer wall by the centrifugal force. Thus, the foreign matter colliding against the inner circumference of the outer wall is adhered to the inner circumference, and its speed declines, so that it falls down by gravity. The passage sectional area of the air lead-in hole is selected smaller than the passage sectional area of the outside region, and hence the air to be dehumidified guided from the air lead-in hole into the outside region is guided into the space of the larger passage sectional area, and part of it sediments and the speed declines. Therefore, the foreign matter falls down by gravity.

Moreover, the air to be dehumidified guided into the outside region moves to the inside region through the communication hole, and is compressed while passing through this narrow communication hole, and the density of foreign matter is heightened, and oil particles of oily matter contact and adsorb each other to form large oil particles so as to fall down easily by gravity. Still more, the air to be dehumidified having passed through the communication hole is guided into the inside region which is a wider space than the communication hole, and part of the air to be dehumidified having passed through the communication hole sediments, and the speed declines. Hence, the foreign matter falls down by gravity.

Thus, in the cyclone separator, the foreign matter can be separated by the four actions, that is, partial speed decline due to sedimentation when the air to be dehumidified is guided from the air lead-in hole into the outside region, collision of the air to be dehumidified against the inner circumference of the outer wall due to centrifugal force when moving in the outside region, forming of large drops of oil by compression when the air to be dehumidified passes through the communication hole, and partial speed decline due to sedimentation when the air to be humidified is guided from the communication hole into the inside region. Theref ore, the foreign matter contained in the air to be dehumidified can be separated efficiently. Hence, the life of the primary and secondary filters and the separation membrane element can be further extended, so that they may be used preferably in the air dehumidifying apparatus for marine use.

In a fifth aspect of the invention, a region opposed to the air lead-in hole is avoided in forming the communication hole.

According to the fifth aspect of the invention, in the region opposite to the air lead-in hole of the inner tube, the communication hole for communicating between the outside region and inside region is not formed. Hence, it prevents the trouble of the air to be dehumidified guided into the outside region from the air lead-in hole, as being discharged toward the primary filter as being guided into the inside region, without moving about the central axis of the inner circumference of the outer wall in the outside region, and by moving about the central axis of the inner circumference of the outer wall in the outside region, the foreign matter separation effect by centrifugal force can be achieved securely, and the foreign matter separating effect is enhanced. Moreover, as the air introduced from the air lead-in hole collides against the region opposite to the air lead-in hole of the inner tube, the foreign matter is adhered to the inner tube, and is hence separated, so that the foreign matter separating effect is also enhanced.

In a sixth aspect of the invention, the inner tube has a plurality of the communication holes formed at intervals in the circumferential direction thereof.

According to the sixth aspect of the invention, plural communication holes are formed at intervals in the circumferential direction of the inner tube. The air to be dehumidified moving in the outside region of the outer side of the inner tube moves partly in the inside region in the portion opposite to the communication hole of the outside region, and therefore the pressure is lowered from the remaining portion of the part opposite to the communication holes in the outside region. Therefore, when the air to be dehumidified moves in the outside region, it moves meandering, in the direction approaching the inner tube in the portion opposite to the communication holes, and approaching the outer wall in the remaining portion of the part opposite to the communication holes. Therefore, the air to be dehumidified does not move in the outside region in a lamellar form, but moves discontinuously while colliding against the inner circumference of the outer wall, and therefore the separation effect of foreign matter can be enhanced by collision against the inner circumference of the outer wall. Moreover, the air to be dehumidified in the outside region can be stirred, and the foreign matter can be removed not only from the air moving near the inner circumference of the outer wall out of the air to be dehumidified, but also from the entire air.

In a seventh aspect of the invention, a peripheral part opposed to the communication hole of the inner tube is formed so as to have a sectional shape of a convex curve toward the communication hole.

According to the seventh aspect of the invention, the peripheral part opposite to the communication hole in the inner tube is formed in a convex curve toward the communication hole in its sectional shape. Accordingly, the air to be dehumidified passing through the communication hole can smoothly move into the inner circumference of the inner tube. Therefore, the foreign matter contained in the air to be dehumidified guided into the inner region is easily adhered to the inner circumference of the inner tube, and the foreign matter separation effect is enhanced. Moreover, since there is no corner in the inner circumference opposite to the communication hole, generation of vibration of the peripheral part due to passing of the air to be dehumidified is suppressed, and occurrence of noise is suppressed.

BRIEF DESCRIPTION OF THE DRAWINGS

Other and further objects, features, and advantages of the invention will be more explicit from the following detailed description taken with reference to the drawings wherein.

DETAILED DESCRIPTION OF THE PREFERRED EMBODIMENTS

Figure 1:
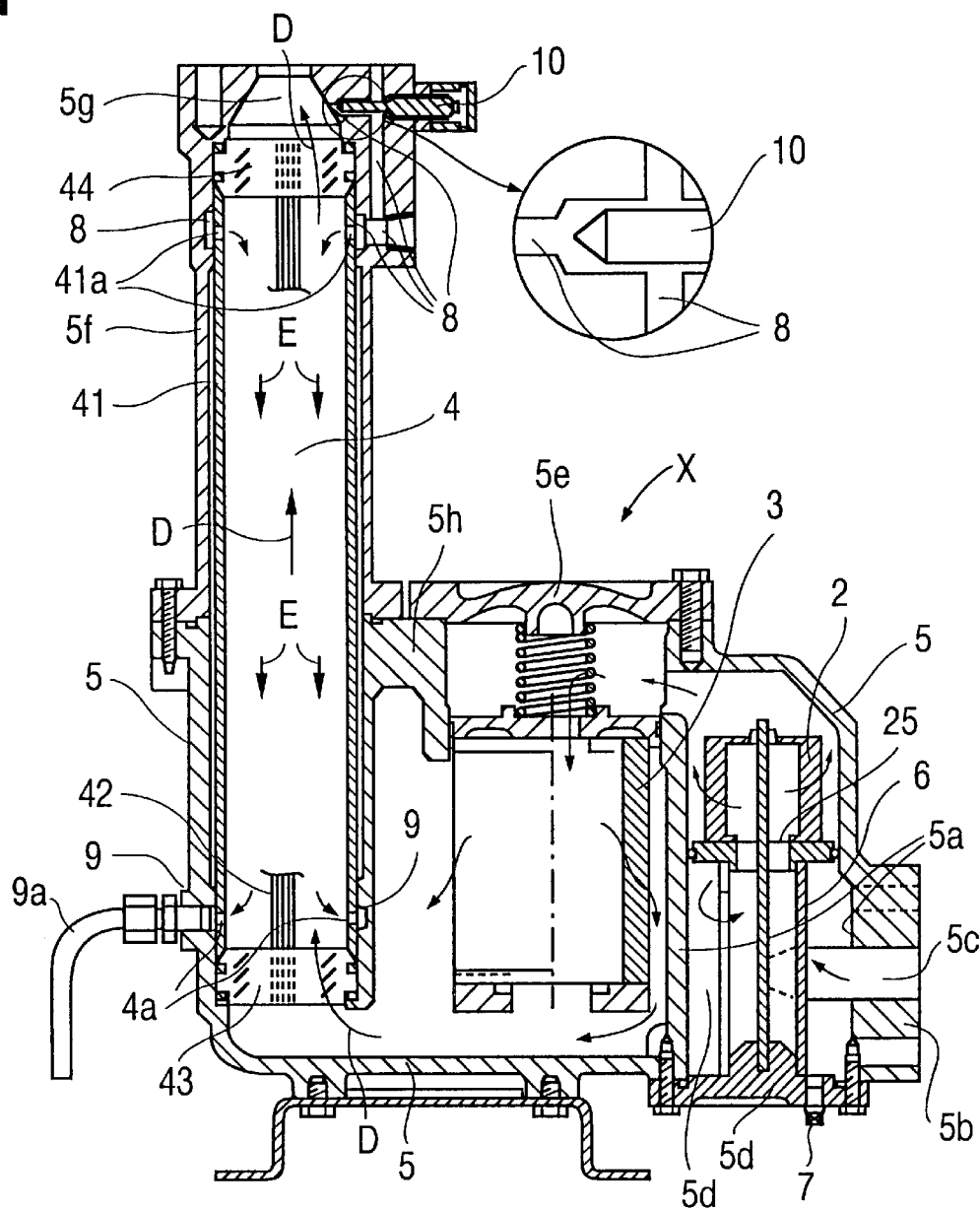
FIG. 1 is a sectional view showing an entire air dehumidifying apparatus X constructed in accordance with an embodiment of the invention.

Now referring to the drawings, preferred embodiments of the invention are described below.

Figure 2:
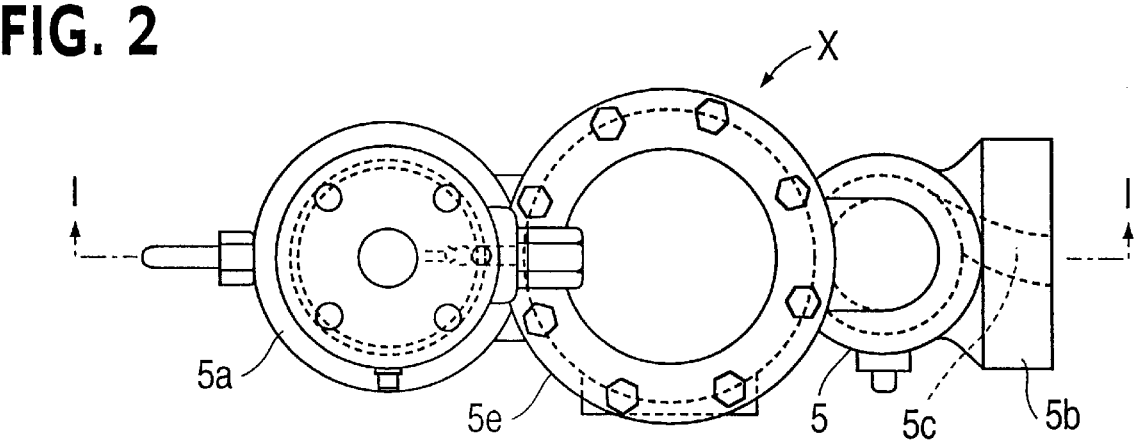
FIG. 2 is a plan view of the air dehumidifying apparatus X shown in FIG. 1.

FIG. 1 is a sectional view showing an an air dehumidifying apparatus X constructed in accordance with an embodiment of the invention, and FIG. 2 is a plan view of the air dehumidifying apparatus X. FIG. 1 also shows a sectional view as seen from section line I—I in FIG. 2. The air dehumidifying apparatus X comprises a cyclone separator 1, a primary filter 2, a secondary filter 3, and a separation membrane element 4, being disposed so as to pass sequentially the introduced air, that is, damp air. A casing is provided for accommodating the primary and secondary filters 2, 3 and separation membrane element 4, and for forming at least an outer wall 5a of the cyclone separator 1. In addition, although not shown, pressure gauges for detecting the differential pressure due to pressure loss by passing through the filters 2, 3, and others are provided appropriately. This air dehumidifying apparatus X is installed in a ship, and is designed to receive the air to be dehumidified, that is, damp air, dehumidify this damp air, and send out dry air, for example, in order to obtain dry air to be supplied into the boiler or instrumentation.

Figure 3:
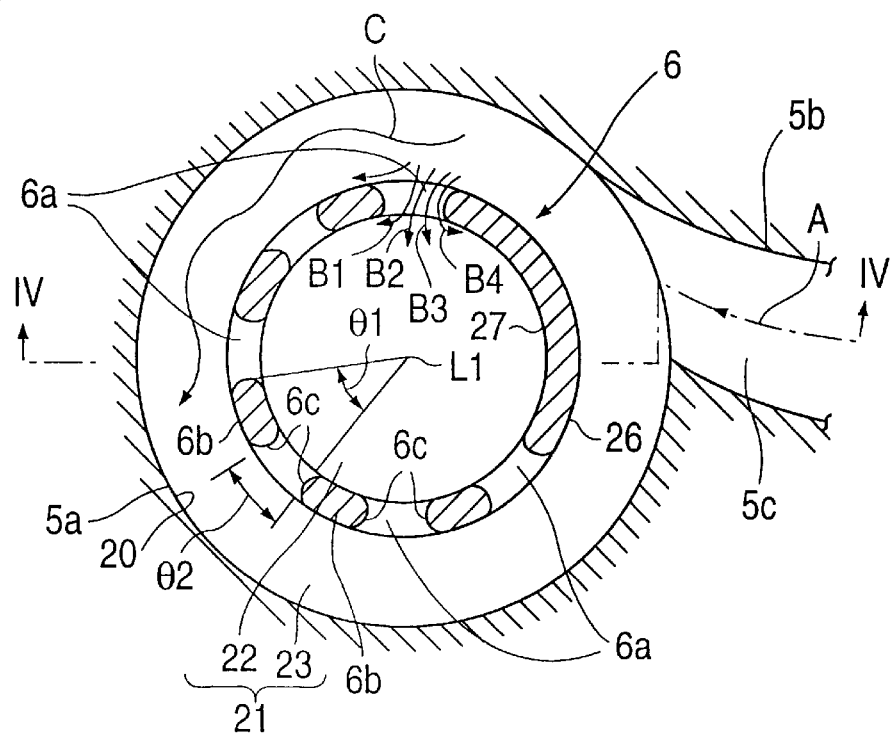
FIG. 3 is a sectional view showing a constitution of a cyclone separator 1.
Figure 4:
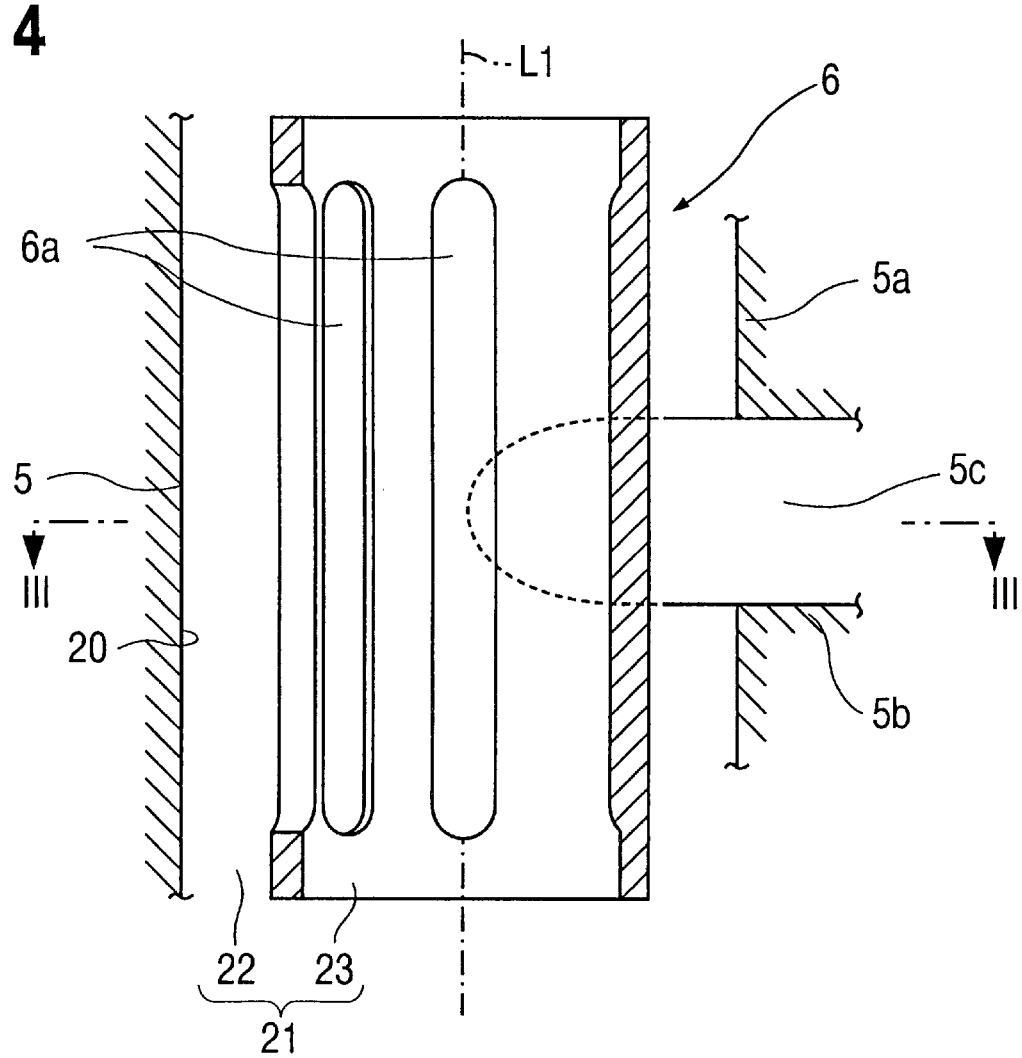
FIG. 4 is a sectional view taken along section line IV—IV in FIG. 3.

FIG. 3 is a sectional view showing the cyclone separator 1, and FIG. 4 is a sectional view as seen from section line IV—IV in FIG. 3. FIG. 3 also shows a sectional view as seen from section line III—III in FIG. 4. Referring also to FIG. 1 and FIG. 2, the cyclone separator 1 has an outer wall 5a formed by a part of the casing 5. This cyclone separator 1 includes the outer wall 5a having a right cylindrical inner circumference 20, and an inner tube 6 provided in a space 21 enclosed by the inner circumference 20 of the outer wall 5a, and by this inner tube 6, the space 21 is partitioned into an inside region 22 at the inward side in the radial direction, and an annular outside region 23 at the outward side in the radial direction of the inside region 22. A central axial line L1 of the inner circumference 20 of the outer wall 5a is perpendicular, and the inner tube 6 is cylindrical, and its axial line is provided at a position coinciding with the central axial line L1 of the inner circumference 20 of the outer wall 5a. The housing 5 and inner tube 6 are, for example, made of aluminum die-casting, so that the housing 5 and inner tube 6 are light in weight and high in corrosion resistance. Alternatively, the housing 5 and inner tube 6 may be made of stainless steel, and a high corrosion resistance is also achieved by using stainless steel.

An air lead-in hole 5c is formed, in an air lead-in portion 5b forming of outer wall 5a. The lead-in hole 5c supplies compressed air in a supply direction A which deviates outward in the radial direction from the central axial line L1 of the inner circumference 20 of the outer wall 5a. The passage sectional area of the air lead-in hole 5c is selected so as to be smaller than the passage sectional area of the outside region 23. Moreover, in the inner tube 6, a communication passage formed by a plurality of holes 6a for communicating between the inside region 22 and outside region 23 is formed, and the lower end at one end in the axial direction of the inner tube 6 is clogged by a lid 5d described below, while a discharge port 25 communicating with the primary filter 2 is provided at the upper end of the filter 2 at the other end in the axial direction.

The communication holes 6a are formed in the region opposite to the air lead-in hole 5c of the inner tube 6, and a plurality, or six in this embodiment, are formed at intervals in the peripheral direction of the inner tube 6. The communication holes 6a are slots extending parallel to the axial line L1, and are formed in the peripheral direction of the inner tube 6, at every θ1, in a width of 2θ2. In this embodiment, θ1 is selected at 45 degrees, and θ2 is 22.5 degrees. That is, having a same width as the wall 6b between adjacent communication holes 6a, or a width of 22.5 degrees in the peripheral direction in this embodiment. They peripheral edges 6c defining the communication holes 6a of the wall 6b of the inner tube 6 are formed in a convex curve toward the communication hole 6a in its sectional shape.

The damp air thus fed into the air dehumidifying apparatus X is, for example, compressed air supplied from an air source such as compressed air sump. Also, the compressed air supplied into this air dehumidifying apparatus X is first supplied into the cyclone separator 1. In the cyclone separator 1, the compressed air is supplied into the outside region 23, eccentrically eccentric from the hole 5c in the air inlet nozzle 5b of the casing 5, that is, in direction A which deviates outward in the radial direction from the axial line L1 as mentioned above. As the compressed air, fed into the outside region 23, is thus supplied eccentrically, it moves while turning about the axial line L1, i.e. counterclockwise in FIG. 3 in the outside region 23. In this embodiment, the compressed air is rotated by the cyclone separator 1, that is, the compressed air turns in the outside region 23 and is moved from the communication hole 6a formed in the inner tube 6 to the inside region. The air rises in the inside region 22, is discharged from the discharge port 25, and is sent into the primary filter 2. The inner tube 6 also supports the primary filter 2. In the cyclone separator 1, the compressed air flows in at a relatively high flow velocity, for example, about 3 m/sec, and water drops, oil drops, dust, and other foreign matter contained in the compressed air are separated by the centrifugal force primarily due to this flow velocity.

Since much oil is used in the general compressor, the compressed air is accompanied by used lubricating oil, debris, and much drain, as well as steam, and when the drain and steam are sent into the boiler and the instrumentation, adverse effects are caused on the boiler and the instrumentation. Accordingly, by installing the air dehumidifying apparatus X, steam is removed, together with drain and foreign matter. The foreign matter also has adverse effects such as clogging the separation membrane element 4 of the air dehumidifying apparatus X. Therefore, the primary and secondary filters 2 and 3 are provided, and moreover the cyclone separator 1 is disposed in order to maintain the capacity of the filters 2, 3, that is, to prevent early clogging of the filters 2, 3 due to foreign matter.

This cyclone separator 1 is basically a cyclone type for making use of the characteristics of the circular motion of the fluid, that is, compressed air containing foreign matter. Since the conventional cyclone type separator is intended to separate the fluid into gas and powder, it is necessary to evaluate the separation effect in the compressed air containing drain as foreign matter. In this embodiment, the separator is designed so that the compressed air supplied from the air lead-in hole 5c may flow along the inner circumference 20 of the outer wall 5a, and as evaluation of separation effect, investigation is made into the separation on the inner circumference 20, that is, the difference in friction of air and foreign matter adhering and staying on the inner circumference 20. Herein, as the most typical foreign matter, oil is studied.

Concerning the outside region 23 of the cyclone separator 1, it is difficult to study the difference in the friction, and therefore the pressure loss h in the air lead-in hole 5c is studied herein. The pressure loss h is expressed as follows.

$$h = \lambda \times (l/d) \times (V^2/2g) \quad (1)$$

where $\lambda$: frictional resistance (equivalent to coefficient of pressure loss)

l: length of air lead-in hole d: inside diameter of air lead-in hole v: flow velocity g: gravitational acceleration.

All terms other than the frictional resistance $\lambda$ are constant whether in air or in oil, and hence the pressure loss h is different between air and oil only in terms of the frictional resistance $\lambda$. This frictional resistance $\lambda$ is expressed as follows according to Blasius formula:

$$\lambda = 0.3164/Re^{1/4} \quad (2)$$

where Re: Reynolds number.

This Reynolds number is determined in the following condition.

Compressed air temperature t=30° C. (entire air containing oil)

Compressed air pressure

P=7 kg/cm²G (entire air containing oil)

Flow rate of compressed air

Q=50 m³/h (entire air containing oil)

Coefficient of kinematic viscosity of air $v_1 = 0.166 \times 10^{-4}$ m²/sec (air only)

Specific gravity of air $\gamma_1 = 1.13$ kg/m³ (air only, at atmospheric pressure)

Coefficient of kinematic viscosity of oil $v_0 = 0.60 \times 10^{-4}$ m²/sec

Specific gravity of oil $\gamma_0 = 860.00$ kg/m³

Supposing R to be gas constant, the specific gravity of air $\gamma_a$ under pressure, and the apparent flow velocity v of air (containing oil) at the air lead-in hole are as follows:

$$\gamma_a = P/(R \times T) = \{(7+1.033) \times 10^4\}/\{29.27 \times (273+30)\} = 9.05 \text{ kg/m}^3 \quad (3)$$

$$v = \{50 \times (1/9.05)\}/\{(\pi/4) \times 0.025^2 \times 3600)\} = 3.13 \text{ m/sec} \quad (4)$$

Properties of air under pressure, viscosity $\mu_a$ and mass velocity $G_a$ are $$\mu_a = \lambda_1 \times \gamma_1 = 0.188 \times 10^{-4} \text{ kg/m sec} \quad (5)$$

$$G_a = v \times \gamma_a = 28.3 \text{ kg/m}^2 \text{ sec} \quad (6)$$

Whence the Reynolds number of air $Re_a$ and Reynolds number of oil $Re_o$ are $$Re_a = (G_a \times D)/\mu_a = (28.3 \times 0.025)/0.188 \times 10^{-4} \approx 37600 \quad (7)$$

$$Re_o = (v \times D)/v_0 = (3.13 \times 0.025)/0.6 \times 10^4 = 1304$$

Putting these Reynolds numbers $Re_a$ and $Re_o$ into formula (2), the frictional resistance of air $\lambda_a$ and frictional resistance of oil $\lambda_o$ are $$\lambda_a = 0.3164/Re_a^{1/4} \approx 0.0227 \qquad (8)$$

$$\lambda_o = 0.3164/Re_o^{1/4} \approx 0.0527 \qquad (9)$$

and hence, $$\lambda_a : \lambda_o \approx 1:2.3 \qquad (10)$$

Therefore, the relation between the pressure loss of air $h_a$ and pressure loss of oil $h_o$ is as follows:

$$h_a : h_o \approx 1:2.3 \qquad (11)$$

Such relation of pressure losses $h_a$ and $h_o$ seems to be nearly the same also in the outside region 23. From the relation of the pressure losses $h_a$ and $h_o$, it is evident that the oil receives more resistance from the inner circumference 20 than the air, and therefore the oil is lowered in speed more than the air and is likely to fall down by the action of the gravity, so that the oil is separated from the air.

Moreover, by the centrifugal force of circular motion, the force F pushing toward the inner circumference 20 is given as follows:

$$F = m \times a \qquad (12)$$

where m is the specific weight and a is the acceleration. The force acting on the air $F_a$ and the force acting on the oil $F_o$ differ only in terms of the specific weight m, that is, the difference of specific weight of air $\gamma_a$ and specific weight of oil $\gamma_o$ since the acceleration a is constant, and the relation between the specific weight of air $\gamma_a$ and specific weight of oil $\gamma_o$ is as follows.

$$\gamma_a : \gamma_o = 9.05 : 860 \approx 1:95 \qquad (13)$$

Accordingly, the relation of the force acting on the air $F_a$ and the force acting on the oil $F_o$ is $$F_a : F_o \approx 1:95 \qquad (14)$$

Actually, the oil is like a mist, and it is evident that there is a difference between the force acting on the air $F_a$ and the force acting on the oil $F_o$, although the difference is not so obvious as shown in formula (13) and (14). By this difference of the force acting on the air $F_a$ and the force acting on the oil $F_o$, it is clear that the oil receives a greater frictional resistance from the inner circumference 20 than the air, and hence, being inclined to stay within the inner circumference 20, the speed of oil is also reduced more than the speed of air, and thus is likely to fall down due to the action of gravity. That is, the oil is separated from the air. In this way, it is confirmed that the oil and other foreign matter can be separated from the compressed air by the cyclone separator 1.

In the cyclone separator 1, the compressed air collides against the inner circumference 20 of the outer wall 5a due to the centrifugal force. Therefore, the oil, dust and other foreign matter contained in the compressed air, which are higher in specific gravity than the air, are likely to collide against the inner circumference 20 of the outer wall 5a due to the centrifugal force as mentioned above. The foreign matter thus colliding against the inner circumference 20 of the outer wall 5a adhere to the inner circumference 20, or are lowered in speed so as to fall down by gravity. Further, the passage sectional area of the air lead-in hole 5a is selected so as to be smaller than the passage sectional area of the outside region 23, and the compressed air guided into the outside region 23 from the air lead-in hole 5c is led into the space of the larger passage sectional area, and partly sediments and declines in speed. Therefore, the foreign matter falls down by gravity.

Moreover, the compressed air led into the outside region 23 moves into the inside region 22 through the communication hole 6a, and is compressed by the process of passing through the narrow communication hole 6a, and hence the density of the foreign matter is increased, and oil drops contact with each other and adsorb to form large oil drops, which easily to fall down under the action of gravity. Furthermore, the compressed air, having passed through the communication hole 6a, is guided into the inside region 22 of a wider space than the communication hole 6a, and part of the compressed air having passed through the communication hole 6a sediments, and the speed thereof declines. Therefore, the foreign matter falls down by gravity.

Thus, in the cyclone separator 1, the foreign matter can be separated by the four actions, that is, 1) partial speed decline due to sedimentation when the compressed air is guided from the air lead-in hole 5c into the outside region 23, 2) collision of the compressed air against the inner circumference 20 of the outer wall 5a due to centrifugal force when moving in the outside region 23, 3) formation of large drops of oil by compression when the compressed air passes through the communication holes 6a, and 4) partial speed decline due to sedimentation when the compressed air is guided from the communication holes 6a into the inside region 22. Therefore, the majority of the oil, dust and foreign matter contained in the compressed air can be separated and removed efficiently.

Further, a communication hole 6a is not formed in the region of the inner tube, directly opposing the air lead-in hole 5c, the communication hole 6a is not formed, and hence, it avoids the trouble of the compressed air being discharged toward the primary filter as it is guided into the inside region 22, without turning about the central axis of the inner circumference 20 of the outer wall 5a in the outside region 23. The foreign matter separation effect can be achieved securely by centrifugal force acting by turning in the outside region 23, and thus the foreign matter separating effect is enhanced. Moreover, as the compressed air collides against the region opposite to the air lead-in hole 5c of the inner tube 6, the foreign matter adheres to the inner tube 6, and is hence separated, so that the foreign matter separating effect is also enhanced.

The communication holes 6a are formed at intervals in the circumferential direction of the inner tube 6, and the compressed air turning in the outside region 23 moves partly into the inside region 22 in the communication holes 6a as indicated by arrows B1 to B4 in FIG. 3, and therefore the pressure is lowered from the remaining communication holes 6a in the outside region 23. Therefore, when the compressed air moves in the outside region, it moves in a meandering manner, as indicated by arrow C in FIG. 3, in the direction approaching the the removing communication holes 6a. Therefore, the compressed air does not make a mere circular move in the outside region 23 in a lamellar form, but moves discontinuously while colliding against the inner circumference 20 of the outer wall 5a, and therefore the separation effect of foreign matter can be enhanced by collision against the inner circumference 20 of the outer wall 5a. Moreover, the compressed air in the outside region 22 can be stirred, and the foreign matter can be removed not only from the air moving near the inner circumference 20 of the outer wall 5a, but also from the entire compressed air. In particular, in this embodiment, since the communication holes 6a are formed at equal intervals, the pressure of the compressed air changes in a specific period when turning in the outside region 23, so that the meandering motion is easy.

Also, the peripheral portions 6c defining the communication hole 6a in the inner tube 6 is formed in a convex curve toward the communication hole 6a in its sectional shape. The compressed air can smoothly move into the inner circumference 27 of the inner tube 6 as indicated by arrows B1 and B4. Therefore, the foreign matter contained in the compressed air guided into the inner region 22 is easily adhered to the inner circumference 27 of the inner tube 6, and the foreign matter separation effect is enhanced. Moreover, since there is no corner at the peripheral portions 6c, generation of vibration of the peripheral portions 6c due to the passing compressed air is suppressed, and the occurrence of noise is suppressed.

Herein, in the embodiment, the communication holes 6a are formed at equal intervals, but in another form, however, the communication holes 6a may be formed at different intervals, so that the compressed air turning while meandering in the outside region 23 may easily collide against the wall 6b of the inner tube 6. As a result, the compressed air containing much foreign matter is prevented from directly moving into the inside region 22. Although the communication holes 6a are formed in slots extending parallel to the axial line L1, in another form, they may be formed spirally so as to be at twisted positions relative to the axial line L1, or may be formed as circular, elliptical or polygonal holes, and such holes may be formed at intervals in the circumferential direction, or plural rows may be formed in the axial direction. In such modes, too, the meandering effects of compressed air are similarly achieved.

In another mode, at least one surface of the inner circumference 20 of the outer wall 5a, and the outer circumference 26 and inner circumference 27 of the inner tube 6 may be made of a material on which oil and foreign matter are likely to adhere, so that the foreign matter separation effect may be promoted by adhesion of oil and foreign matter. Alternatively, at least one of the surfaces is roughened or provided with small protrusions, so that oil and foreign matter are likely to adhere, and the separation effect of foreign matter may be enhanced.

The compressed air is supplied to the primary filter 2 from the cyclone separator 1. The primary filter 2 is made of cotton paper of a mesh size of several micrometers, or 3 μm in the embodiment. The primary filter 2 captures foreign matter particles larger than 3 μm, out of the oil drops, moisture, dust and foreign matter not removed by the cyclone separator 1. In this case, since large particles of foreign matter have been already removed by the cyclone separator 1, the filtering load and the contamination by the foreign matter to be removed by the primary filter 2 are substantially decreased. As a result, the life of the primary filter 2 is longer than before, and it is expected to be at least about 2 years. Incidentally, the primary filter 2 is formed in the upper part of the cyclone separator 1, and when combined together, the height is similar to the secondary filter 3, so that the entire structure is more compact. The compressed air, having passed through the cyclone separator 1 is supplied to the inside of the primary filter 2, and is passed through the primary filter and is discharged to the outside, and therefore the air flow is smooth, and the pressure loss is as small as 0.5 kgf/cm$^2$. The primary filter 2 can be detached and attached by removing the lid 5d provided in the bottom of the cyclone separator 1. The lid 5d is provided with a drain cock 7 for discharging the oily matter removed by the cyclone separator 1 and primary filter 2.

The compressed air is supplied to the secondary filter 3 from the primary filter 2. The secondary filter 3 is made of glass fiber with a mesh size of about one-hundredth of a micrometer, or 0.01 μm in this embodiment, and captures and removes fine foreign matter such as oil mist that cannot be removed by the primary filter 2. In this case, since the foreign matter has been sufficiently removed by the cyclone separator 1 and primary filter 2, the secondary filter has a small thus filtering load and thus has a service life of as long as 6 years. Captured oil mist and other foreign matter gather to form large particles, which are discharged from the drain cock, not shown, provided in the bottom of the casing 5. The secondary filter 3 can be detached and attached by removing the upper lid 5e.

The compressed air is supplied to the separation membrane element 4 after having passed through the secondary filter 3. The separation membrane element 4 is formed by an aluminum housing or case 41 accommodated in a casing composed of a casing main body 5h and a tube body 5f to be connected therewith, a plurality of membrane tubes 42 formed in a bundle accommodated almost uniformly in the aluminum case 41 (partially shown in FIG. 1), and inlet and outlet support pieces 43, 44 for adhering and supporting the membrane tubes. The support pieces 43, 44 support each membrane tube 42 so that only the space in the membrane tubes 42 may communicate with the outside. That is, the space in the membrane tubes 42 does not communicate with the outside through the support pieces 43, 44. Each of the membrane tubes be 42 is a fine tube made of polyimide film with a diameter (inside diameter) of 0.3 mm, and a length of about 600 mm, and about a thousand tubes form a bundle. The polylmide film is an example of material capable of separating steam from the air, and it has a property of passing damp air of relatively high pressure, also a property of passing the steam in the damp air at a speed of several hundred times faster than the passing speed of dry air (nitrogen and oxygen). As a result, in the membrane tubes 42 made of polyimide film having such properties, when damp air, that is, the compressed air having passed through the secondary filter 3 is passed at a proper pressure and flow velocity so as to exhibit the properties, the dry air propagates in the membrane tubes 42 while the steam is forced out of the membrane tubes, so that steam can be separated and removed from the compressed air having passed through the secondary filter 3.

At the upper end of the tube body 5f, there is an air passage 8 for supplying a portion the air which has passed through the membrane tubes 42 into the space among the membrane tubes 42, from outside at the upper position- of the bundle of the membrane tubes 42. An air passage 9 is formed in casing man body 5h at a position corresponding to the lower part of the bundle of each membrane tube 42, and a discharge tube 9a is connected to this air passage 9. A needle valve 10 is placed in the air passage 8, and this needle valve 10 is a valve for adjusting the passage sectional area of the air passage 8 In the aluminum case 41, moreover, penetration holes 41a are formed so as to communicate with the air passages 8, 9, near both ends in the length direction of the bundle of membrane tubes 42. The penetration holes 41a are formed, at least in two positions each, at the confronting positions, that is, along one diameter line of the aluminum case, at both ends in the length direction of the bundle of the membrane tubes 42 as shown in the drawing. Alternatively, they may be formed at three or four positions at both ends in the length direction of the bundle of the membrane tubes 42. A ventilation path is formed, in which part of the air flowing in the membrane tubes 42 is introduced into the space among the membrane tubes 42 from plural positions outside at one end in the length direction of the bundle of the membrane tubes 42, and discharged outside from plural positions at the other end on the opposite side of the one end in the length direction of the bundle of membrane tubes 42. This ventilation path is composed of air passages 8, 9, etc.

By the separation membrane element 4, when the compressed air, having passed through the secondary filter 3, is supplied into the membrane tubes 42 opened at one end of the inlet support piece 43, by the pressure of the compressed air, only the steam in the compressed air passes through the film of the membrane tubes 42, and is forced out into the space among the membrane tubes 42 outside the membrane tubes 42. And, the compressed air supplied into the membrane tubes 42 is rid of steam so as to become dry air, which is discharged from the separation membrane element 4 by passing through the portion of the outlet support piece 44, so that the dry air is sent out from the air dehumidifying apparatus X through an outlet nozzle 5g.

On the other hand, part of the dry air is fed into the air passage 8 as purge air, and is guided into the space among the membrane tubes 42 of the separation membrane element 4 through the upper holes 41a opened in the aluminum case 41, and flows in the opposite direction to the air flow direction in the membrane tubes 42, and absorbs the steam having passed outside from within the membrane tubes 42, and is discharged from the discharge pipe 9a through the lower holes 41a and air passage 9. By thus passing the purge air through the ventilation path, the bundle of membrane tubes 42 is regenerated into a state not containing moisture, and therefore the moisture, that is, the steam can be removed and separated continuously by the membrane tubes 42. In FIG. 1, the flow of compressed air is indicated by a long arrow D, and the flow of purge air is indicated by a short arrows E.

Since the dry air discharged from the separation membrane element 4 is introduced from plural positions in the upper part of the separation membrane element 4 and is discharged from plural positions in the lower part, the purge air contacts the entire membrane tubes 42 uniformly, so that the steam forced outside of the membrane tubes 42 can be sufficiently captured by the purge air. As a result, the regeneration efficiency of the membrane tubes 42 is extremely excellent. Incidentally, as shown in the drawing, when the air passage 8, air passage 9, and discharge pipe 9a are mutually disposed at both ends in the length direction of the separation membrane element 4, the flow of the purge air may be more uniform.

The dryness of the dry air thus discharged out from the air dehumidifying apparatus X is almost determined by the air pressure in the membrane tubes 42 and purge air volume, but since the regeneration efficiency is excellent as mentioned above, for example, when treating saturated damp air at 40° C. at pressure of 9 kgf/cm$^2$G, supposing the purge air volume to be about 10% of the input air volume, it is possible to dehumidify until the dew point temperature of the output air becomes about −20° C.

The compressed air supplied into the separation membrane element 4 is sufficiently pretreated by the cyclone separator 1 and the primary and secondary filters 2 and 3, and oily matter and foreign matter are almost completely removed, so that the membrane tubes 42 may have a long life, long enough for marine use, for example.

The constituent components of the air dehumidifying apparatus X, that is, the cyclone separator 1, the primary and secondary filters 2, 3, and the separation membrane element 4 are all disposed in one integrated casing 5. Thus, this construction has many effects as follows. That is, the entire air dehumidifying apparatus X is small and compact, and moreover, among other effects, a part of the casing 5 can be used as the outer wall 5a of the cyclone separator 1, installation work of constituent components at the site of installation of the air dehumidifying apparatus X and piping connection of the constituent components are not necessary, the air flow among the constituent components is smooth and short, the pressure loss is decreased, and the performance is enhanced, and the whole air dehumidifying apparatus X can be manufactured and completed in one shipyard, so that control of the apparatus such as maintenance of performance and supply of parts is facilited. When mounting the air dehumidifying apparatus aboard aship, considering the narrow space in the ship, inefficient work in the ship, and importance of ease of maintenance of parts during international navigation, the air dehumidifying apparatus X of the invention is very convenient for marine use. Although not shown, the constituent components may be also independent individually or integrated partly, and may be connected together by piping to compose the air dehumidifying apparatus. In this case, in the manufacturing shop, the constituent components may be preliminarily assembled in units on panel or common board. Anyway, by the application of the invention, since the life of the filters and separation membrane element is extended, it can be applied, for example, in marine use.

The invention may be applied, of course, not only in the air dehumidifying apparatus for marine use, but also in the air dehumidifying apparatus for land use in any field.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. An air dehumidifying apparatus comprising:

an outer casing defining an air inlet, a dry air nozzle, and a separated-steam outlet;

a cyclone separator disposed adjacent said air inlet;

a primary filter disposed in said outer casing downstream of said cyclone separator;

a secondary filter disposed in said outer casing downstream of said primary filter, said secondary filter having a smaller mesh size than that of said primary filter; and a separation membrane element disposed in said outer casing downstream of said secondary filter for separating steam from air which has passed through said secondary filter, wherein the separated steam and the dehumidified air are discharged from said outer casing individually.

2. The air dehumidifying apparatus as claimed in claim 1, wherein an outer wall of said cyclone separator is formed by said outer casing.

3. The air dehumidifying apparatus as claimed in claim 1, wherein said separation membrane element comprises:

an outer housing member having a first end for receiving a flow of air which has passed through said secondary filter, a second end communicating with said dry air outlet nozzle, a plurality of purge air inlet openings axially spaced from the second end of said outer housing member, and a plurality of discharge openings axially spaced from the first end of said outer housing member; and a plurality of membrane pipes disposed in said outer housing member.

4. The air dehumidifying apparatus as claimed in claim 3, further comprising:

a purge air flow passage formed in said outer casing adjacent said dry air outlet nozzle, said purge air flow passable communicating said second end of said outer housing member and said purge air inlet openings formed in said outer housing member;

a needle valve disposed in said purse air flow passage; and an air discharge passage formed in said outer casing adjacent said first end of said outer housing member, said air discharge passage communicating with said discharge openings formed in said outer housing member.

5. The air dehumidifying apparatus as claimed in claim 1, wherein said cyclone separator comprises:

an outer wall having a right cylindrical inner circumference; and an inner tube disposed in a space defined by the inner circumference of said outer wall, said inner tube partitioning the space into an inside region and an annular outside region disposed radially outward relative to the inside region, said air inlet opening into the annular outside region in order to supply air in a supply direction which deviates radially outwardly from a central axial line of the inner circumference of said outer wall, wherein a cross sectional area of the air inlet opening is smaller than a cross sectional area of the outside region, and said inner tube includes a flow communication passage for providing communication between the inside region and the annular outside region, a closed first axial end, and a second axial end provided with a discharge port communicating with said primary filter.

6. The air dehumidifying apparatus as claimed in claim 5, wherein said flow communication passage is formed in a portion of said inner tube which is disposed opposite relative to said air inlet so as to avoid a direct flow of air from said air inlet.

7. The air dehumidifying apparatus as claimed in claim 6, further comprising a lid closing said first axial end of said inner tube, said lid being, removably secured to said outer casing.

8. The air dehumidifying apparatus as claimed in claim 7, wherein said flow communication passage is formed by a plurality of communication holes which are spaced along a circumferential direction of said inner tube.

9. The air dehumidifying apparatus as claimed in claim 7, wherein said flow communication passage is formed by convex peripheral surfaces of said inner tube.

10. The air dehumidifying apparatus as claimed in claim 7, wherein said cyclone separator and said primary filter are coaxially aligned, and said primary filter, said secondary filter, and said separation membrane element are disposed in said casing so that a longitudinal axis of said primary filter, a longitudinal axis of said secondary filter and a longitudinal axis of said separation membrane element are parallel to each other.

* * * * *